H. A. HUNT.
WIND SCOOP.
APPLICATION FILED JAN. 27, 1914.
1,115,315.
Patented Oct. 27, 1914.
2 SHEETS—SHEET 1.
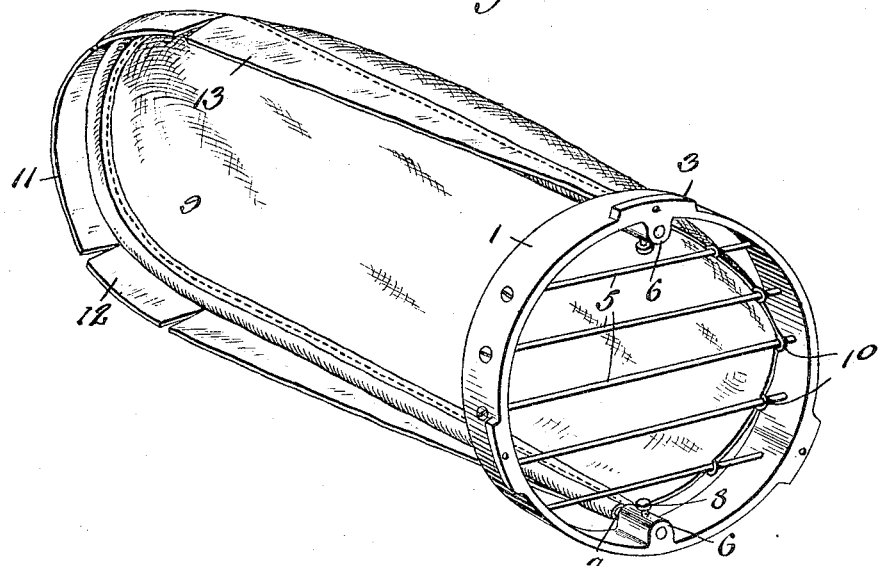
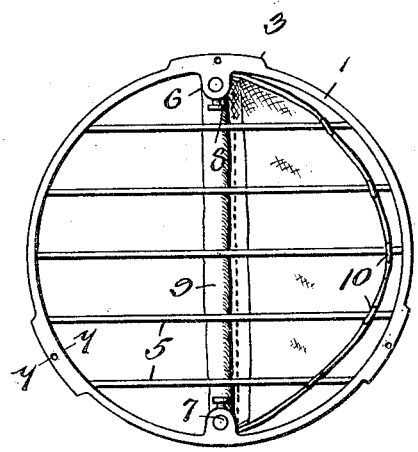
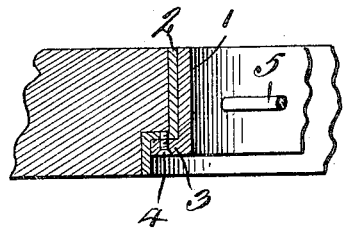
Inventor
H. A. Hunt,
Witnesses
By Victor J. Evans
Attorney H. A. HUNT.
WIND SCOOP.
APPLICATION FILED JAN. 27, 1914.
1,115,315.
Patented Oct. 27, 1914.
2 SHEETS—SHEET 2.
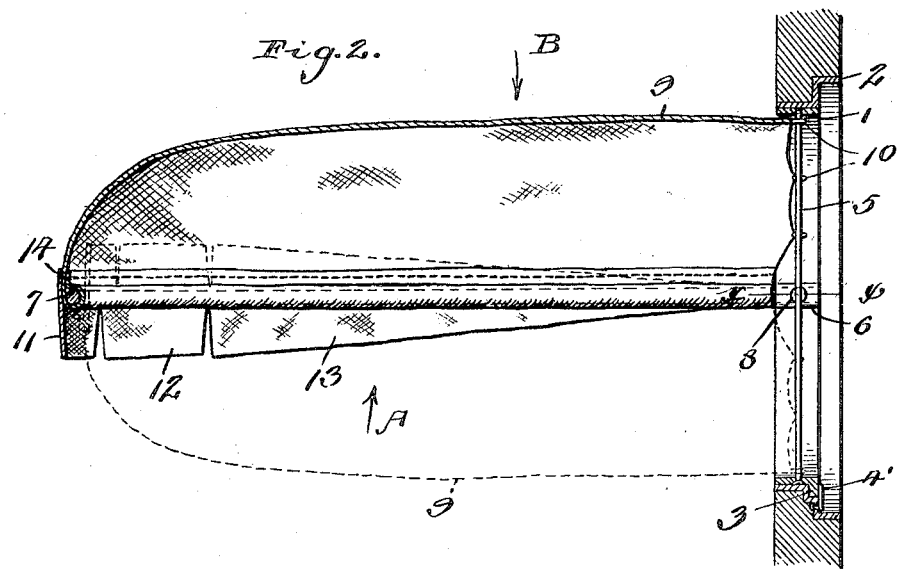
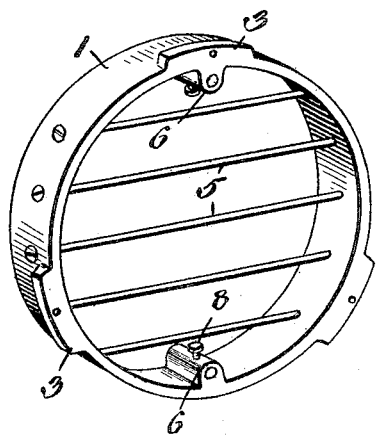
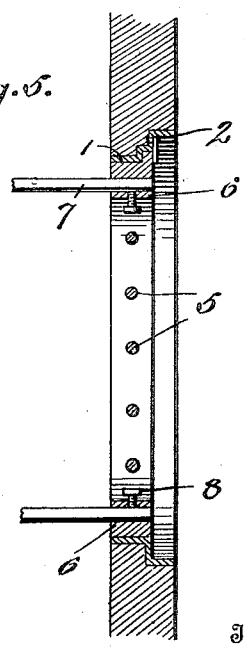
Witnesses
Inventor
H. A. Hunt,
By Victor J. Evans
Attorney

UNITED STATES PATENT OFFICE.

HAYDEN A. HUNT, OF McPHERSON, KANSAS.

WIND-SCOOP.

1,115,315.  Specification of Letters Patent.  Patented Oct. 27, 1914.

Application filed January 27, 1914. Serial No. 814,776.

*To all whom it may concern:*

Be it known that I, HAYDEN A. HUNT, a citizen of the United States, residing at McPherson, in the county of McPherson and State of Kansas, have invented new and useful Improvements in Wind-Scoops, of which the following is a specification.

The present invention relates to wind scoops primarily adapted for use upon port holes of vessels, the object being to provide a device of this character which will automatically adjust itself to the wind to direct the same through the port hole to within the vessel; to construct a device of this character which may be folded or collapsed when not in use, so that the same will occupy only a small space in storage; to construct a wind scoop at a comparatively small cost and which shall embody the desirable features of simplicity as well as ease in application or removal from the port hole of the vessel.

I attain the above objects and others which will appear as the nature of the invention is more fully disclosed by the simple and preferred structure illustrated by the accompanying drawings and set forth at length in the appended claims.

In the drawings: Figure 1 is a perspective view of a wind scoop constructed in accordance with the present invention, Fig. 2 is a central longitudinal sectional view of the same showing the scoop in applied position upon a port hole of a vessel, the dotted lines indicating the reverse position of the scoop when the same is automatically operated by the wind, Fig. 3 is a view looking toward the scoop when in applied position within the port hole, Fig. 4 is a detail of the ring portion of the scoop frame, Fig. 5 is a transverse sectional view taken approximately on the line x—x of Fig. 2, and Fig. 6 is an enlarged sectional view taken approximately on the line y—y of Fig. 2.

In carrying out my invention I provide a frame which includes a ring 1 that is of a size to fit snugly within the rounded port hole 2 of a vessel. The ring is provided with spaced lugs 3, which may serve as stops for limiting the outward movement of the ring when the same frictionally engages with the rounded frame of the port hole 2, or which may be guided within suitable recesses or pockets formed in the frame of the port hole, as indicated in Fig. 2 of the drawings, or which may be provided with threaded openings for the reception of threaded elements 4 or which may be adapted to receive the offset heads of rotatable elements 4 as illustrated in Fig. 3 of the drawings. The ring comprises a flat band, of any suitable width and thickness, and the said ring is provided with a plurality of spaced bars or rods 5 which are transversely arranged longitudinally of the vessel when the ring is positioned within the frame of the port hole. The ring is further provided with diametrically opposite lugs 6 which are disposed transversely of the bars or rods 5, the said lugs being provided with suitable openings for the reception of the opposite ends of a substantially U or bow-shaped member 7. The ends of the U-shaped member 7 are secured within the openings of the lugs in any desired or preferred manner, as for instance, the lugs may be provided with threaded openings transverse of their main openings and communicating with the said main openings, the said transverse openings being adapted for the reception of securing elements in the nature of thumb screws or bolts 8. The body member 7 serves as a shaft around which is connected the end of a flexible scoop 9. The scoop is preferably formed of canvas, and its looped end forms a hinge connection between the scoop proper and the body 7. The inner end of the scoop is provided with eyelets 10 which are engaged by each of the rods 5. By such an arrangement it will be noted that the belly of the scoop will receive the wind and direct the same between the bars 5 through the port hole to within the room provided with the port hole when the wind is blowing in the direction of the arrow A. It will be further noted that should the wind blow in the direction of the arrow B, the outer or bulging portion of the scoop will be forced in an opposite direction to that shown in full lines in Fig. 2, and to occupy the position indicated by the dotted lines in the said figure, the eyelets 10 upon the inner end of the scoop moving longitudinally of the bars 7, while the looped end of the scoop revolves upon the bow or U-shaped member 7.

In practice, I have found it desirable to provide the scoop with, what I will term, a directing lip, the same comprising a plurality of sections, indicated by the numerals 11, 12 and 13. Each of these members comprises a plurality of canvas sections, each of which being stitched to the scoop proper just beyond its looped connection with the U-shaped member 7, as indicated by the numerals 14. The section 7 is arranged at the rounded portion of the member 7 or rather at the connecting portion for the arms of the said member, the sections 12 being disposed at opposite points directly between the rounded end and straightened portions or arms of the members 7, and the portions 13 connected with the straight portions or arms of the member 17. The members 13 incline gradually from their connections adjacent the members 12 to the inner end of the scoop, the sections 12 extending beyond the members 7 a greater length than does the sections 13, while the section 11 projects beyond the connecting member of the U-shaped element 7 a greater distance than do the members 12. When the position of the scoop is reversed by the change of wind, the scoop proper will cause the directing lips to be also reversed, the scoop passing through the U-shaped shaft 7 while the lips are forced in opposite directions over the U-shaped shaft, as will be readily understood.

From the above description, taken in connection with the drawings, it will be noted that the scoop is automatic in its action and that the U-shaped shaft can be readily detached from the ring, and the scoop properly folded around the shaft, that the device may be easily and quickly applied or detached, and when not in use the same can be packed to provide a small bundle which may be readily placed in storage.

Having thus described the invention, what I claim is:

1. In a wind scoop, a ring, transverse bars upon the rail, lugs upon the ring, a bow-shaped member having its arms connected with the bow-shaped member and eyes upon the flexible scoop which engage the transverse bar of the ring.

2. In a wind scoop, a frame, a U-shaped member centrally secured to the frame and projecting outwardly therefrom, a flexible wind scoop having its longitudinal edges connected with the U-shaped member, and the said scoop being also slidably connected with the frame.

3. In a wind scoop, a U-shaped non-flexible member, a scoop of textile material having its edges loosely secured to the said U-shaped member, whereby the same may be passed through the U-shaped member and arranged to either side of the said U-shaped member.

4. In a wind scoop, a substantially U-shaped supporting member and a textile scoop having its edges secured to the said U-shaped member to provide a hinged connection between the said member and the said scoop.

5. In a wind scoop, a substantially U-shaped supporting member, a flexible scoop having its longitudinal edges hingedly connected with the U-shaped member, the said scoop at its connection with the U-shaped member being formed with a directing lip and said loop being made up of a plurality of sections.

6. In a wind scoop, a frame having horizontally disposed spaced bars, a U-shaped support removably secured to and arranged longitudinally of the frame, a flexible scoop having its longitudinal edges and its outer edge looped over and secured to the U-shaped support, the inner edges of the scoop being formed with eyes which are arranged upon the longitudinal bars of the frame, and the edges of the scoop connected with the U-shaped support being provided with a plurality of outwardly extending members forming directing members.

In testimony whereof I affix my signature in presence of two witnesses.

HAYDEN A. HUNT.

Witnesses:
ROBERT E. HUNT,
ROBT. A. SHULTZ.

---

Copies of this patent may be obtained for five cents each, by addressing the "Commissioner of Patents, Washington, D. C."